UNITED STATES PATENT OFFICE 2,560,921

SOLVENT EXTRACTION OF BUTANOLONES FROM WATER

Ernst Bergmann, London, England, assignor to Polymerisable Products Limited, London County, England, a British company No Drawing. Application December 23, 1946, Serial No. 718,111

2 Claims. (Cl. 260—594)

The present invention refers to the production of 3.3-dialkyl-3-hydroxy-2-propanones of the general formula (1) 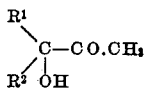

in which $R^1$ and $R^2$ are monovalent hydrocarbon radicals, which either may be separate or may together form parts of a hydroaromatic ring (1-acetyl-cyclo-alkanols).

The present invention further includes a method for the production of the particular 3-alkyl-3-hydroxy-2-butanones of the general formula (2) 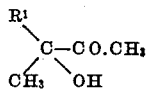

in which $R^1$ represents a monovalent hydrocarbon radical.

The present invention also includes new methods for the isolation of the above products from the reaction mixtures.

It further includes a recycling process for the production of such hydroxy-ketones in which the unreacted portions of the reagents used are continuously recovered and returned to the process.

It was known (see e. g. Berichte 55, 2915) that methyl-butanolone can be made with moderate yields (66%) by hydration of the triple bond in methyl-butynol by means of mercuric salts, according to the equation

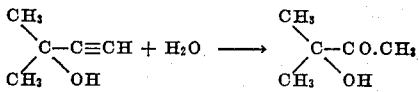

The product in that disclosure was isolated by steam distillation, treatment of the distillate with potassium carbonate and subsequent vacuum distillation. In this way no anhydrous product can be obtained and the aqueous residue from the steam distillation was rejected. For the reaction, per mol (84 grams) methyl-butynol, 66 cc. (121.4 grams) conc. sulphuric acid, 300 cc. water and 10 g. mercuric oxide were used. This solution accordingly will be seen to contain about 14.5 grams of $HgSO_4$ and 117 grs. free $H_2SO_4$.

I have now found that under more suitable conditions 80–85% yields can be obtained without difficulty. The modifications of the process which lead to this improvement consist in the features described in the following:

(a) The amount of sulphuric acid has to be reduced from 66 cc. to 35 cc. (64.4 grs.) per mol, that is by about 40%. (Herein, all the figures on the acid refer to acid of 1.84 S. G.)

(b) Also, care has to be taken that in the initial stage of the reaction temperatures of 25–35° C. should not be exceeded, or else the product has to be removed immediately after the reaction has taken place.

These two features (a and b) not only increase the yield of the desired products, because they diminish the extent to which side reactions occur; they also lower the extent to which the mercuric salt is reduced to the mercurous stage and/or to metallic mercury, hence the mercuric salt solution can be reused one or more times, before being regenerated.

It is, therefore, one of the objects of this invention to provide a process in which the catalyst solution (acid solution of mercuric sulphate) can be reused a certain number of times without diminishing the yield; and when the catalytic activity diminishes, as indicated by a fall in the yield, the mercuric salt can be easily and cheaply recovered by oxidation preferably with fuming sulphuric acid, into a form in which it can be returned to another batch of the starting material to be processed.

The procedure which forms the subject of this invention is, therefore, as follows:

To the mixture of 360 cc. water, 36 cc. (66 grs.) concentrated sulphuric acid and about 10 grs. mercuric oxide (or the equivalent quantities of mercuric sulphate and sulphuric acid), 1 mol of the alkyl-butynol (84 grams when using methyl butynol) is slowly added with stirring. It is convenient to add the first drops at a temperature of 25–30° C. and when the reaction starts as indicated by the formation of a white organic mercury compound, to lower the temperature to 0–20° C. and to maintain it in this range during the course of the addition of all the butynol. The reaction mixture is then heated to a temperature between 60 and 100° for 2 hours with continued stirring and is then steam distilled. Per mol of starting material, the steam distillation should be continued until about 1.5 liters of distillate have been obtained. The residue of the steam distillation is brought to the original volume of 400 cc., either by concentration or by dilution, and is then ready for use with the butynol in the next batch. This procedure can be repeated with this solution for a number of times which is dependent on the nature of the starting material. In the case of methyl-butynol the catalyst solution can be reused 6 times, in the case of the ethyl compound 4 times, in the case of the iso-butyl compound 3 times. The number of times depends mainly on the extent to which such side reactions occur, as reduce the mercuric oxide to the mercurous salt or metallic mercury. When the catalytic activity of the solution is exhausted, substantially all the mercury is contained in form of the metal or in form of the mercurous salt in the residue at the bottom of the reaction vessel together with a small amount of non-distillable resin. If this residue is treated with fuming sulphuric acid, preferably at elevated temperature, all the organic matter contained in it is destroyed and the mercury is converted into mercuric sulphate which can be used in a new series of batches.

In working up the steam distillate which contains the desired organic reaction products (i. e. the hydroxyketones), several possibilities offer themselves. If the product is insoluble in water it is separated and distilled, preferably after an azeotropic dehydration by means of such solvents as benzene or carbon tetrachloride. If the product is water-soluble, which is the case more especially for the lower representatives of the group, the product can be isolated by salting out with potassium carbonate, and distilling it first in presence of benzene in order to remove any remaining water azeotropically, and then, after removal of the benzene, distilling either under ordinary pressure or in vacuo.

Two other possibilities which I have discovered appear less cumbersome. It is possible to distill the steam distillate obtained (e. g. from methyl-butynol) in a column whereby substantially all the product is concentrated in the distillate after one third of the total liquid has been distilled over. The product can then be treated as prescribed for the original solution above.

Of course, the possibility exists to remove from the original steam distillate all the water by azeotropic distillation with a suitable solvent, e. g. benzene or carbon tetrachloride.

Other methods for the isolation of the products are the selective adsorption on a suitable adsorbent (e. g. active charcoal or silica gel), or the selective extraction with such solvents as are immiscible with water and have a useful distribution coefficient for the desired organic reaction product. It has been found that for this latter purpose, esters are particularly useful. If, e. g., an aqueous solution of methyl-butanolone is shaken with an equal volume of butyl acetate, 66% of the methyl-butanolone are transferred into the upper layer.

Examples

[Parts are by weight, if not indicated otherwise.]

*Example 1.*—To a well-agitated mixture of 720 parts water, 112.5 parts concentrated sulphuric acid (say 1.84 sp. g.) and 15 parts mercuric sulphate (or the equivalent quantities of sulphuric acid and mercuric oxide), 155 parts methyl-butynol are slowly added, as indicated above, the temperature being kept below 10° C. during this addition by external cooling. A white precipitate is formed which disappears gradually in the course of the reaction. When the spontaneous interaction is over, the mixture is boiled under reflux for 1 hour and then steam-distilled. 3000 parts distillate are collected. They are e. g. salted out with anhydrous potassium carbonate and the oil (approximately 200 parts) is dehydrated azeotropically with 40 parts benzene and the product distilled in a column. Up to 150 parts of methyl-butanolone are obtained, which is 81% of theory. Boiling point: 138–139°/760 mm.; 78–79°/100 mm. Small amounts of a head fraction and a higher-boiling residue are isolated.

The residue from the steam distillation was concentrated to the original volume (800 parts by volume for 155 parts methyl-butynol) and directly used as the acid mercuric sulphate solution for the next batch.

In two runs (a and b), made according to this example, the following were obtained:

(a) from 155 parts methyl-butynol.
Batch 1: 200.6 parts crude product (the oil), 43 parts water, 154 parts hydroxyketone.
Batch 2: 201 parts crude product (the oil), 40 parts water, 154.5 parts hydroxy-ketone.
Batch 3: 215 parts crude product (the oil), 66 parts water, 141 parts hydroxy-ketone.
Batch 4: 150.4 parts crude product (the oil), 106 parts hydroxy-ketone.

(b) From 310 parts methyl-butynol.
Batch 1: 377 parts crude product, 46 parts water, 292 parts hydroxy-ketone.
Batch 2: 329.9 parts crude product, 25 parts water, 286 parts hydroxy-ketone.
Batch 3: 342 parts crude product, 15 parts water, 302 parts hydroxy-ketone (5 parts residue).
Batch 4: 342 parts crude product, 17 parts water, 304.5 parts hydroxy-ketone (10.5 parts residue).
Batch 5: 330.2 parts crude product, 29 parts water, 307 parts hydroxy-ketone (11 parts residue).

*Example 2.*—Selective extraction of 3-methyl-3-butanol-2-one.

(a) 100 parts by volume of a 6.14% aqueous solution of the hydroxy-ketone were shaken with 100 parts by volume acetaldehyde-dibutyl-acetal. The carbonyl number of the final water layer was 51.0; the hydroxy-ketone concentration had, therefore, decreased to 5.20%, i. e. by 15.3%.

(b) Same experiment with 100 parts by volume butyl acetate. Carbonyl number of the final water layer 23.4; the hydroxy-ketone concentration had decreased to 2.39%, i. e. by 61.12%.

*Example 3.*—1-acetyl-cyclohexanol. 74.6 parts 1-ethinyl-cyclohexanol were slowly added at about 20° to 30° C. to a well-agitated mixture of 240 parts water, 43 parts concentrated sulphuric acid and 7 parts mercuric oxide. After agitation for 2 hours at room temperature, the mass was heated with agitation for 1 hour at 100° C. and then steam-distilled, 500 parts distillate being collected. This (after settling) consisted of an oily bottom layer of 30.3 parts, whilst the treatment of the aqueous layer with anhydrous potassium carbonate gave another 30.5 parts. Distillation under 5 mm. pressure gave 10 parts cyclohexanone, B. P. 60–68°, 48 parts hydroxy-ketone (1 acetyl cyclohexanol), B. P. 68–70°; density, 1.018; refractive index, 1.4667.

*Analysis.*—Calc. for $C_8H_{14}O_2$: C, 67.6; H, 10.0. Found: C, 67.7; H, 10.0.

*Example 4.*—3-isobutyl-3-butanol-2-one. The operating conditions were the same as in Example 1. During the addition of isobutyl-butynol to the catalyst solution (which may take about 1 hour), the temperature should be kept at or below 20° C. A white precipitate is formed which changes quickly into a violet oil, as the reaction proceeds. Steam distillation of the reaction mixture gives a biphasic liquid; most of the reaction product separates as the upper layer, and only a relatively small amount is being recovered by salting-out (with anhydrous potassium carbonate).

Although the yields are not less satisfactory than in the case of the corresponding methyl-compound, the catalyst solution can only be used about two or three times before regeneration. Evidently, a strongly reducing by-product is formed in small quantities, which acts to reduce the mercuric salt too far to be active any further.

A usual batch was 800 parts water; 147 parts concentrated sulphuric acid; 22 parts mercuric sulphate; 252 parts isobutyl-butynol. After the addition, the mixture was boiled for 1 hour, with continued agitation, and steam-distilled. The crude product was directly fractionated. Yield, up to 86%. B. P. of 3-isobutyl-3-butanol-2-one 56°/5 mm., 110°/100 mm.

The reaction taking place is apparently the following:

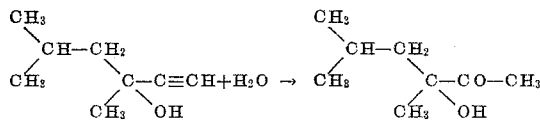

This product is believed to be novel. It can be used for the production of useful products.

*Example 5.*—3 - ethyl - 3 - butanol-2-one. 1440 parts water; 265 parts concentrated sulphuric acid; 40 parts mercuric oxide and 345 parts ethyl-butynol reacted in the manner described in Example 1 for the methyl compound. 3000 parts steam distillate were obtained, which gave, upon saturation with anhydrous potassium carbonate, 441 parts crude product. The azeotropic distillation of the crude product with 40 parts benzene gave 46 parts water. Subsequent fractionation yielded, apart from a head fraction, 362 parts of the desired hydroxyketone, B. P. 151–152°/760 mm. There was no higher-boiling residue. Yield, 88.7% of theory; density, 0.938%; refractive index, 1.4215.

*Analysis.*—Calc. for $C_6H_{12}O_2$: C, 62.1; H, 10.4. Found: C, 61.9; H, 10.3.

The head fraction was 35 parts, consisting of unsaturated ketone of the type

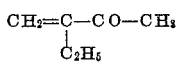

and some methyl ethyl ketone.

Repetition of the experiment with the residue of the steam distillation, suitably brought to a volume of about 1600 parts by volume, gave substantially the same results, i. e. a yield of about 90%.

The product of Example 4 also can be subjected to catalytic dehydration to give a polymerizable unsaturated ketone, or subjected to reductive amination according to my application Ser. No. 718,105, filed concurrently herewith.

It will be understood that after the treatment of acid mercuric sulphate with an acetylenic alcohol, and the ensuing reaction, some of the mercuric sulphate has been reduced to mercurous sulphate or free mercury or both, and the presence of these substances does not interfere with the steam distillation.

I claim:

1. A process of removing an alkyl butanolone having an OH group attached to the tertiary carbon atom which latter is attached to the CO group, from a steam-distillate containing same which comprises the selective extraction from such steam-distillate by butyl acetate, which is a good solvent for said butanolone and which acetate is not readily soluble in water.

2. A method of extracting an alkyl butanolone containing a tertiary alcohol group alpha to a carbonyl group, from an aqueous solution thereof which comprises agitating such solution with butyl acetate, and thereafter separating such mixture into an aqueous layer and an organic layer.

ERNST BERGMANN.

REFERENCES CITED

The following references are of record in the file of this patent:

UNITED STATES PATENTS

| Number | Name | Date |
|---|---|---|
| 1,896,161 | Carter | Feb. 7, 1933 |
| 1,967,225 | Conaway | July 24, 1934 |
| 2,243,701 | Halbig et al. | May 27, 1941 |
| 2,244,837 | Halbig et al. | June 10, 1941 |
| 2,271,684 | Dons et al. | Feb. 3, 1942 |
| 2,288,211 | Schulz | June 30, 1942 |
| 2,333,756 | Wentworth | Nov. 9, 1943 |
| 2,405,873 | Blumenfeld | Aug. 13, 1946 |

FOREIGN PATENTS

| Number | Country | Date |
|---|---|---|
| 849,807 | France | Dec. 2, 1939 |

OTHER REFERENCES

Beilstein, Band I, Zweites Ergänzungswerk, page 882.

Scheibler et al.: Berichte, 55B, 2903–2923 (1922).

Othmer et al.: Ind. Eng. Chem., vol. 37, pages 890–894 (1945).